United States Patent [19]

Rothbühr et al.

[11] 4,179,494
[45] Dec. 18, 1979

[54] PROCESS FOR THE PRODUCTION OF CARBON BLACK

[75] Inventors: Lothar Rothbühr, Hermulheim; Manfred Voll, Hanau, both of Fed. Rep. of Germany

[73] Assignee: Deutsche Gold- und Silber-Scheideanstalt vormals Roessler, Frankfurt, Fed. Rep. of Germany

[21] Appl. No.: 699,973

[22] Filed: Jun. 25, 1976

[30] Foreign Application Priority Data

May 12, 1976 [DE] Fed. Rep. of Germany ....... 2530371

[51] Int. Cl.² .......................... C01B 31/02; C09C 1/48
[52] U.S. Cl. ..................................... 423/456; 423/450; 422/150
[58] Field of Search ............... 423/450, 455, 456, 457; 23/259.5; 422/150

[56] References Cited

U.S. PATENT DOCUMENTS

| | | | |
|---|---|---|---|
| 2,851,337 | 9/1958 | Heller | 423/455 |
| 2,971,822 | 2/1961 | Williams | 423/456 X |
| 3,079,236 | 2/1963 | Heller et al. | 23/259.5 X |
| 3,222,131 | 12/1965 | Powell et al. | 23/209.4 |
| 3,490,869 | 1/1970 | Heller | 423/455 |
| 3,490,870 | 1/1970 | DeLand | 23/209.4 |
| 3,522,005 | 7/1970 | Braddock | 423/457 |
| 3,567,395 | 3/1971 | Henderson et al. | 23/259.5 |
| 3,642,446 | 2/1972 | Heller et al. | 23/259.5 X |
| 3,922,335 | 11/1975 | Jordan | 423/450 |
| 3,984,528 | 10/1976 | Cheng et al. | 423/450 |

FOREIGN PATENT DOCUMENTS

| | | |
|---|---|---|
| 1189221 | 3/1965 | Fed. Rep. of Germany. |
| 1211736 | 3/1966 | Fed. Rep. of Germany. |
| 2000112 | 7/1970 | Fed. Rep. of Germany. |
| 1910125 | 9/1970 | Fed. Rep. of Germany. |
| 1592853 | 12/1971 | Fed. Rep. of Germany. |
| 2128030 | 12/1971 | Fed. Rep. of Germany. |
| 1592852 | 2/1972 | Fed. Rep. of Germany. |
| 1592955 | 10/1973 | Fed. Rep. of Germany. |
| 2418274 | 10/1974 | Fed. Rep. of Germany. |

*Primary Examiner*—O. R. Vertiz
*Assistant Examiner*—Gregory A. Heller
*Attorney, Agent, or Firm*—Cushman, Darby & Cushman

[57] ABSTRACT

Furnace black is produced by a thermal splitting of a carbon black forming oil by oxidation of a fuel in a combustion chamber with production of a stream of hot combustion gases, introduction of this stream in a constricted mixing chamber narrower than the fuel chamber, inserting the carbon black forming material into the mixing chamber and conveying the mixture into an enlarged reaction chamber compared to the mixing chamber as well as quenching the carbon black containing reaction mixture, the stream of hot combustion gases being introduced into the mixing chamber via an annular channel or introducing the stream into an annular channel shaped mixing chamber and spraying in the carbon black forming material into the mixing chamber or ring conduit from within outwardly.

1 Claim, 6 Drawing Figures

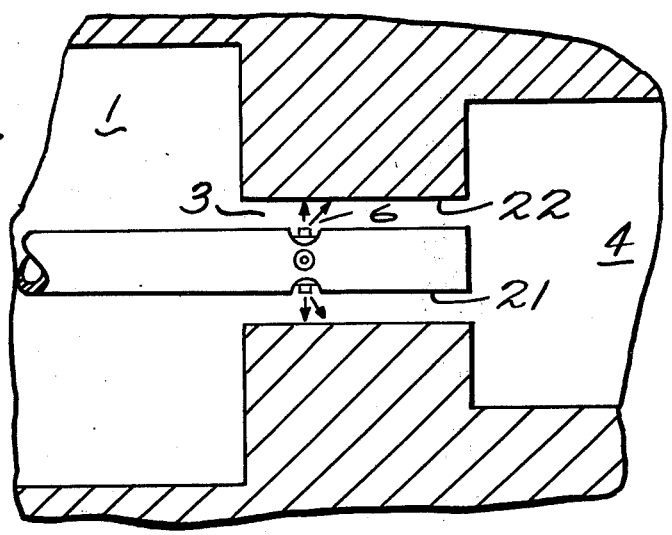
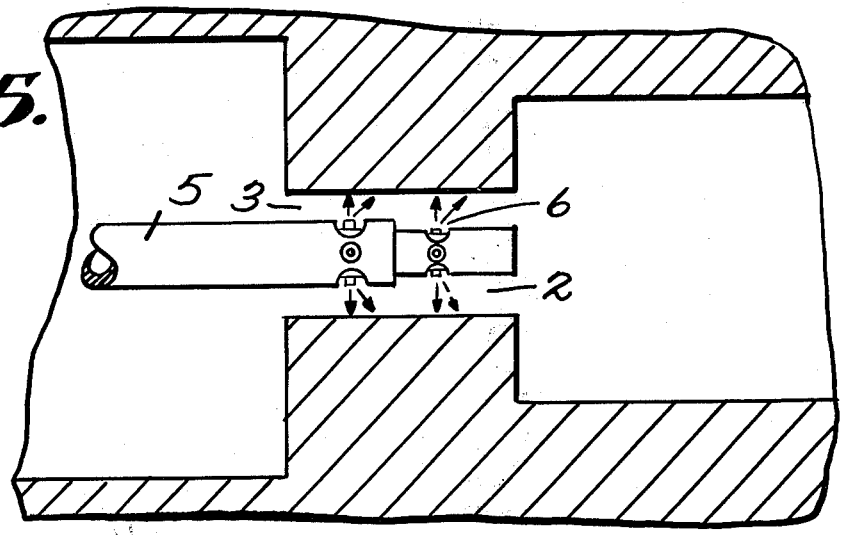
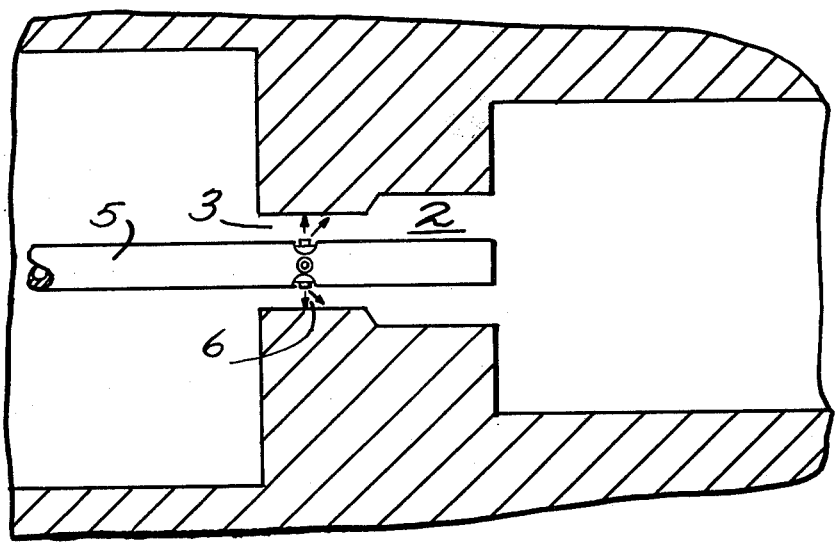

PROCESS FOR THE PRODUCTION OF CARBON BLACK

The oven black or furnace black process today is the most important process for the production of common blacks and special carbon black qualities because of the closed, easily automatable method of operation. Furthermore, it has the advantage of the completely continuous method of operation as well as a more favorable utilization of heat than other processes. There also results as a rule in the furnace black production, a burnable waste gas which can be used to heat drying plants and to produce steam. Because of the several mentioned advantages there have been experiments to always more flexibly shape this process also in regard to the carbon black qualities producible and to prepare new modes of action, procedures and apparatuses which fulfill the special requirements of needed carbon black qualities.

The invention is directed to a process by which there can be produced a broad spectrum of types of carbon black with more favorable industrial colour and industrial rubber properties. Besides the invention is concerned with a carbon black reactor which has the advantage in the versatility of the types of carbon black producible therein with improved economy.

The commonly applicable principle for the production of furnace blacks with primary particle sizes of less than 40 mm and corresponding BET surface areas of greater than 60 m$^2$/g consists of the following:

By tangentially flowing in an oxygen containing medium (usually air) in a cylindrical or truncated conical chamber there is produced a spiral flow which progresses in the direction of the longitudinal axis of the cylinder or truncated cone. In this air stream, a fuel is added either from the axis (for example Dobbin German Pat. No. 1,189,221, acknowledging U.S. application No. 348,414, Apr. 13, 1953; and Dahmen German Offenlegungsschrift 2,418,274, acknowledging U.S. applications Ser. Nos. 351,311, filed Apr. 16, 1973, 396,379, filed Sept. 12, 1973 and 419,782, filed Nov. 28, 1973) or from the periphery (Dollinger German OS No. 1,592,955 acknowledging U.S. application Ser. No. 595,091, Nov. 17, 1966; DeLand German OS No. 1,592,853, and related U.S. Pat. No. 3,490,870) which burns and produces a hot mass of rotary moving gases. Then there is sprayed into this hot gas mass a for the most part liquid carbon black forming material, whereby a portion of the carbon black forming material burns and the rest is reacted by thermal splitting into carbon black and hydrogen. As carbon black forming materials there are employed, for example, hydrocarbon containing high aromatic compositions such as coal tar oil, ethylene cracker residues and other petroleum products.

The processes can be differentiated according to the type of mixing principle for mixing the carbon black forming material into the hot combustion gases.

The first group of processes uses a constant chamber geometry, for example, a cylinder which is simultaneously the combustion chamber and the reaction chamber. A typical apparatus is described in Jager German OS No. 1,910,125.

A second group of processes have a separate combustion chamber and a reaction chamber or zone, the volume and diameter of the combustion chamber usually being greater than that of the reaction chamber. A typical apparatus is described in Dahmen German OS No. 2,418,274.

The mixing intensity realizable with both of these groups of processes in no case is sufficient to satisfy all requirements of variability and carbon black quality.

A third group of processes for producing carbon black operates with a combustion chamber in which hot combustion gases are produced into which the carbon black forming material is sprayed. In order to intensify the mixing, the hot combustion gases after spraying in the oil are led through a narrow section or constriction. The constriction thereby can be formed stepwise in the form of a baffle ring (Powell German OS No. 1,211,736 and related Powell U.S. Pat. No. 3,222,131, and Dobbin German Pat. No. 1,189,211) or truncated cone (Heller German OS No. 1,592,852, acknowledging U.S. application Ser. No. 595,091, filed Nov. 17, 1966).

The invention is based on the problem of providing a process for the production of carbon black by means of a thermal splitting carbon black forming material by oxidation of a fuel in a combustion chamber with production of a stream of hot combustion gases, introduction of this stream into a narrower mixing chamber than the combustion chamber, inserting the carbon black forming material into the mixing chamber and conveying the mixture into an enlarged reaction chamber as compared to the mixing chamber as well as quenching the carbon black containing reaction mixture.

The process of the invention is characterized by introducing the stream of hot combustion gases into the mixing chamber via an annular channel or introducing the stream into an annular conduit shaped mixing chamber and spraying in the carbon black forming material into the mixing chamber or annular channel from within outwardly.

The process makes use of a reactor which is made of completely high fire-resistant brick, produces a flow of hot combustion gases and introduces this into a narrowed section. Here the carbon black forming material is sprayed in in the direction of from within outwardly at the place in the reactor where the velocity is the highest. The carbon black formation takes place in a connected, enlarged reaction chamber.

It has proven advantageous that the axial velocity of the hot combustion gases entering the annular channel or mixing chamber be greater than 400 meters/sec. and preferably be between 600 and 850 m/sec.* The velocity can be as high as 1000 m/sec. The spraying in of the carbon black forming material advantageously takes place at a spraying angle between 45° and 180°. It is further advantageous if a spiral flow is produced in the combustion chamber.

*The maximum of velocity can be the velocity of sound at the given temperature.

Another object of the invention is the carbon black produced by the described process as well as its use as a rubber black with improved abrasion properties (e.g., better resistance to abrasion) and greater tensile strength as well as color blacks with increased color strength and depth of color.

Furthermore, the invention is directed to an apparatus for carrying out the process of the invention. The apparatus is characterized by a chamber for the combustion of a fuel with an oxygen containing gas, a greatly constricted mixing chamber connected to an combustion chamber, as well as an annular channel arranged between the two chambers or forming the mixing chamber, an enlarged reaction chamber connected with the mixing chamber and an atomizing apparatus for the carbon black forming material having outlets directed from inward outwardly which atomizing apparatus is either fitted in or before the mixing chamber, after or in the annular channel or in an annular conduit shaped mixing chamber.

The apparatus of the invention can thus be so built that the atomizer is fitted in the mixing chamber after the annular channel or in the annular channel before the mixing chamber or in an annular conduit shaped mixing chamber.

According to one embodiment which provides a combination of the annular channel with a mixing chamber, preferably cylindrical, passing through the center thereof, the carbon black forming material atomization apparatus is arranged in the axis of the mixing chamber.

The annular conduit can be formed from the inner jacket of the mixing chamber and the outer jacket of the carbon black forming material atomization apparatus or of a replacement body of lesser diameter than the diameter of the mixing chamber or of a section of the named jacket.

A favorable form of the apparatus which especially permits a variable adjustment of the place of inserting the carbon black forming material during the operation, a quick interchange and purification of the spraying apparatus as well as a quick new complement of outlet devices, in a given case with change of the angle of spraying, consists of a displaceable, supported carbon black forming material atomization apparatus led through the front wall of the reactor and along the common middle axis of the chambers, said atomization apparatus having outlets at the end directed from the middle axis outwardly with formation of an annular conduit of variable length extending into the mixing chamber.

Another advantageous development of the invention provides that the outwardly directed outlets are arranged in the outer jacket of a carbon black atomization apparatus arranged in an annular conduit shaped mixing chamber. Thereby the cross-sectional area of the annular conduit shaped mixing chamber can be the same or larger than the cross-sectional area of the ring conduit.

It has further proven suitable that the cross-sectional area between the combustion chamber entrance and the mixing chamber entrance be at least 7 to 1, preferably 7 to 50:1, and that the cross-sectional area ratio between the reaction chamber outlet and mixing chamber outlet be between 4:1 and 10:1.

In all of the proposed embodiments, the outlets of the carbon black forming material atomization apparatus is at best so regulated that the spraying angle is between 45° and 180° C.

The length of the mixing chamber is adjusted according to the provided range of the throughput ratio.

Besides the already named advantages, the process and apparatus of the invention permit an absolutely clean separation of the process in the individual reactor chambers. In the fuel chamber there is exclusively the formation of hot gases with which the carbon black forming material is cracked. In the mixing chamber at the shortest residence time, there is effected practically exclusively the thorough mixing of hot gas and carbon black forming material. In the reaction chamber the formation of carbon black can progress definitely and controllably.

The process and apparatus permit the production of improved yields of carbon black. Furthermore, they permit therewith a rubber black with improved abrasion properties and tensile strength as well as color blacks having increased color strength and depth of color.

To be sure there has already been reported an apparatus and process which utilize a water cooled combustion chamber and narrowed section of metal in which the carbon black forming raw material is pressed inwardly from the outer wall through a few holes and in which there is connected a reactor of greater cross-section (German OS No. 2,128,030). This apparatus and process departs basically in regard to the formation of the narrowed section and the apparatus for introduction of the carbon black forming materials from the objects of the present invention, so that the process conditions of the present invention cannot be employed. As further disadvantages of the known construction and method of operation there may be mentioned the spatial consequences of water cooled metal and the subjecting of wall parts to high temperature, which cause density and cooling problems. Furthermore, the mixing point and mixing angle of the liquid carbon black forming material cannot be changed without difficulty.

In contrast for the process of the present invention there has proven essential the leading of the hot combustion gases over an annular channel into a mixing chamber or alternatively in a ring conduit shaped mixing chamber as well as a spraying in of the carbon black forming material into a mixing chamber or annular channel in the direction of the chamber or annular channel from within outwardly. The surprising advantage comprises the production of an unusually high mixing intensity for the mixing of the carbon black forming material into the hot combustion gases and in the advantages taking place therethrough in regard to cost and carbon black quality.

The annular conduit permits the production of extremely high flow speeds and extremely high turbulences at the place where the carbon black forming material is added. It is believed that these turbulences arise through the considerable wall friction of the flowing medium and, for example, at different cross-sectional areas, for the annular channel and mixing chamber, through formation of back flowing effects at rebounding borders.

The extremely high flow velocity and turbulence effected in such manner previously has not been employed in processes for the production of carbon black. The turbulence is brought about by the mixing of the carbon black forming material into the hot combustion gases and the intimate thorough mixing.

The advantages producible with the invention also cannot be attained with an apparatus such as is described in German OS No. 2,000,112. This consists of a combustion chamber in which a combustion is produced with formation of a stream of hot combustion gases, a reaction chamber connected via a restricted opening at the outlet side of this combustion chamber and an apparatus for the dispersion of a charging hydrocarbon in hot gas, which, moreover, can discharge within or after the restricted opening. The known apparatus differs, however, decisively therethrough from the apparatus of the invention in that the restricted opening is not constructed as an annular chamber and there is missing such an after connected mixing chamber in which the carbon black forming material can be sprayed in from within outwardly.

The invention will be understood best in connection with the drawings wherein:

FIG. 4 is a schematic presentation of an apparatus according to the invention with one form of an atomizer arranged in an annular conduit shaped mixing chamber;

FIG. 5 is a schematic presentation similar to FIG. 4 employing an alternative form of atomizer; and FIG. 6 is a schematic presentation similar to FIG. 4 employing still another form of atomizer.

Figure 1:
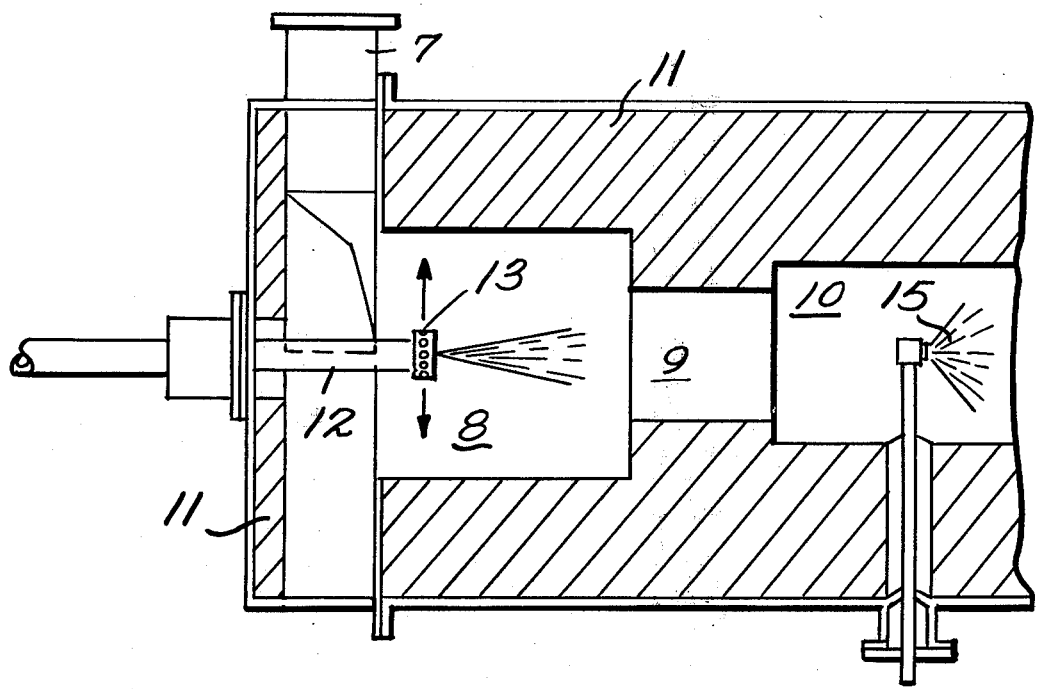
FIG. 1 is a schematic presentation of a known type of reactor with which the comparison experiments were carried out.

An advantageous process for the production of carbon black in completely brick lined reactors with twisting flow is illustrated, for example, in Rothbühr, German OS 2,410,565 and related Rothbühr U.S. Application 555,084, filed Mar. 4, 1975. The entire disclosure of the Rothbühr U.S. Application is hereby incorporated by reference and relied upon. According to the Rothbühr German and U.S. Applications, preheated combustion air is allowed to flow into a combustion chamber in such manner that a spiral flow results. In this twisted flow, gas is added from a burner-injector combination so that a mass of hot rotating gases is formed. The carbon black forming material is sprayed into this hot gas mass and the reaction mixture subsequently led through a constriction. The carbon black formation begins in the combustion chamber, continues in the constriction (narrow place) and is concluded in the reaction chamber. In this known type of reactor according to FIG. 1 of the present application, preheated combustion air enters through the line 7 tangentially into the combustion chamber 8. The combustion chamber, the subsequent narrow section 9 and the reaction chamber 10 are provided with a high fire resistant brick lining 11 based on aluminum oxide. In the middle axis of the reactor there is arranged a fuel burner-carbon black forming material injector combination 12 from which at 13 fuel, usually fuel gas, is given into the hot air. Thereby there is formed a mass of hot combustion gases which move further in direction to the narrow place 9. There is sprayed into these hot gases at 14 the liquid carbon black forming material (oil), in most cases by means of two material atomizers. After passage of the narrow place 9 the reaction is finished in the reaction chamber 10 and the reaction mixture quenched by spraying water into the reaction mixture at 15. Characteristic of this process and the most typical processes for production of carbon is the extended carbon black formation over all three zones (combustion chamber, narrow place, and reaction chamber).

Figure 2:
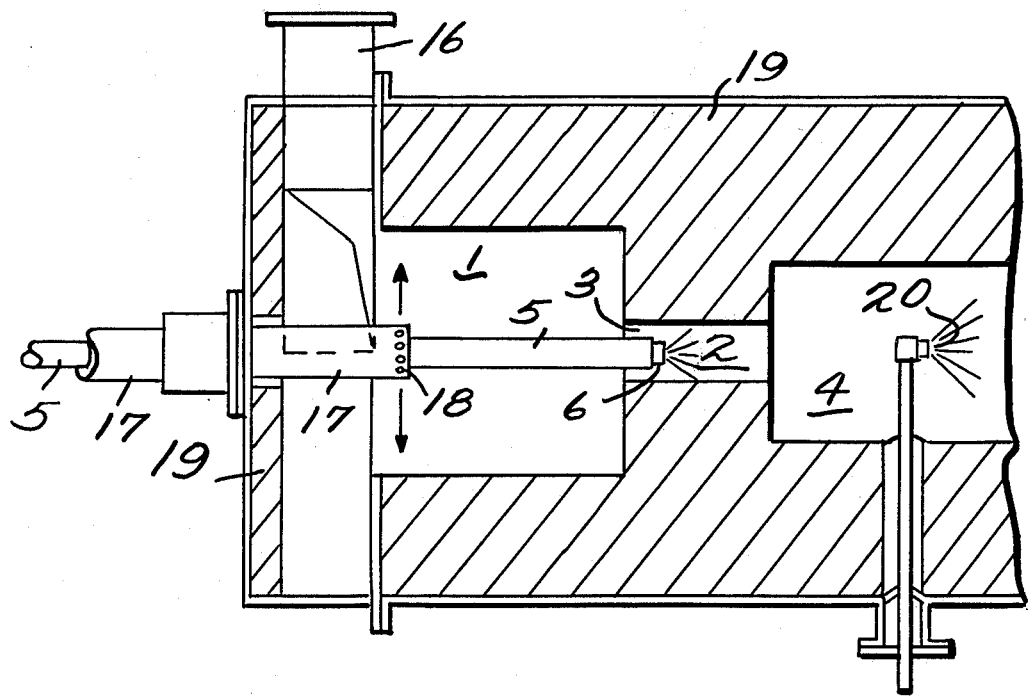
FIG. 2 is a schematic presentation of one form of apparatus according to the invention with longitudinally movable atomizer arranged in the mixing chamber after the annular channel.

In the form of the reactor of the present invention embodied in FIG. 2, preheated air enters the combustion chamber 1 tangentially through an air conduit 16 and produces a twisting flow. In place of air there can be used other oxidation agents for the production of hot fuel gases, e.g., oxygen enriched air or oxygen itself. By addition of gas jets from a burner cartridge 17 at point 18 into the combustion chamber 1 there is produced a twisting flow of extremely hot combustion waste gases. The combustion gases whose temperature preferably is at the load limit of the high fire resistant brick material 19 are moved further in direction to the mixing chamber 2. In the burner cartridge there is arranged a longitudinally movable carbon black forming material atomization apparatus 5 which is protected against overheating, which apparatus 5 is so inserted in the mixing chamber 2 in the working position that the hot combustion gases must enter the mixing chamber 2 through an annular channel 3. The carbon black forming material is added from the outlets 6 of the atomization apparatus in the form of a hollow cone perpendicular to the middle axis of the reactor or inclined in the direction of flow of the reaction mixture in the direction of the wall of the mixing chamber 2. In the mixing chamber there occurs an ideal, instantaneous and absolutely homogeneous mixing of the carbon black forming material with the hot combustion gases, so that the carbon black can form in the reaction chamber 4 and at the desired place, e.g., the place 20, the reaction can be discontinued by spraying in water.

The apparatus of the invention is not limited to the type of fuel addition from the middle axis of the reactor shown in FIG. 2, the fuel addition rather can also take place from the periphery of the combustion chamber 1, e.g., by addition in the combustion air. The addition of the combustion air also need not take place from a single place of addition, but can also be distributed from several places of addition. Furthermore, the combustion chamber need not go to the mixing chamber in a stepwise manner in order to then expand stepwise to the reaction chamber.

Decisive and characteristic on the contrary is the introduction of the hot combustion gases into the mixing chamber through an annular channel with a sharp constriction in cross-section (compared to the cross-section of the combustion chamber), whereby suitably velocities of above 400 meters/sec., preferably 600–850 m/sec. are used for the reaction mixture and the addition directed from within outwardly of the generally liquid carbon black forming material taking place at the high velocities and high turbulences with extremely quick mixing of the carbon black forming materials. Thereby it has proven advantageous to bring in the carbon black forming material substantially in the form of a hollow cone with an opening angle between 45° and 180°. For this purpose, there can be used different known apparatuses, as, for example, hollow cone pressure atomizers.

Figure 3:
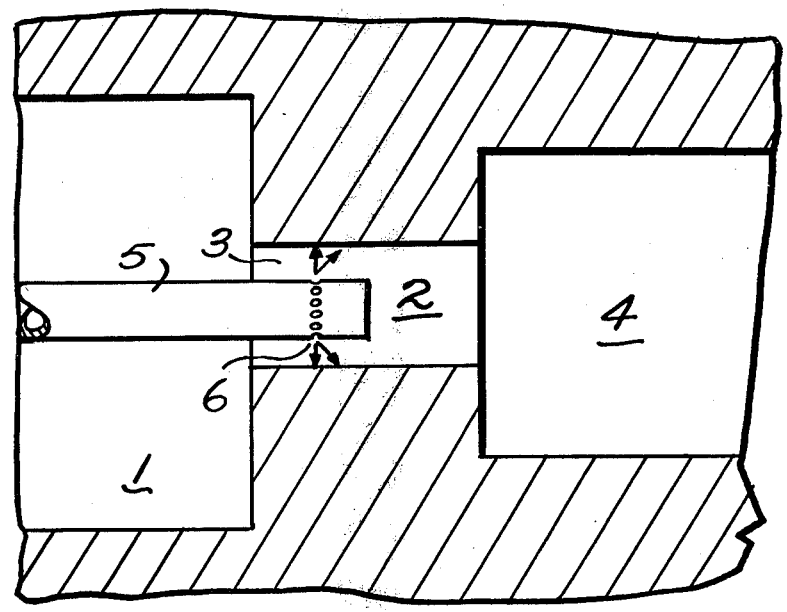
FIG. 3 is a schematic presentation of a variant of the apparatus with the atomizer arranged in the annular channel before the mixing chamber.

The apparatus shown in FIG. 3 provides the addition of the carbon black forming material into the mixing chamber 2 of the in series connected annular channel 3. The addition of carbon black forming material can thereby again take place through an atomizer-injector combination 5 introduced from the forward side of the reactor. The outlets 6 of the atomizer-injector discharge into the jacket of the atomization apparatus.

The mixing chamber can also be built in annular conduit (or channel) form. In FIG. 4 the annular channel and the annular channel shaped mixing chamber have the same cross section, i.e., the two form an aligned unit. The annular conduit is formed from the jacket 21 of a carbon black forming material atomization apparatus 5 operating as a central displacement body and the mixing chamber wall 22. The outlets 6 of the carbon black atomization apparatus 5 discharge again into the jacket of the atomizer 5.

In variant B of FIG. 5, the annular channel shaped mixing chamber 2 has a greater cross-sectional area than the annular channel 3. This is accomplished by stepwise reducing the cross-section of a displacement body of circular cross-section arranged in a cylinder, in the present case of a carbon black forming material charging apparatus 5 in the direction from the annular channel 3 to the mixing chamber 2. The outlets of the carbon black forming material atomization apparatus 5 can here discharge either into the annular channel (unbroken arrows) or into the mixing chamber (broken line arrows).

In variant C of FIG. 6, the outside of the cylindrical jacket bounding the annular channel 3 and the mixing chamber 2 widens in conical manner in the direction of the annular channel to the mixing chamber while the central carbon black forming material atomization apparatus extends through the entire annular channel-mixing chamber section with the same cross-section.

The advantage of employing the procedure of the present invention will be seen from the several examples which follow in which examples there was employed the apparatus of FIG. 2. However, the invention is not limited by such examples or to such apparatus.

Unless otherwise indicated all parts and percentages are by weight.

Below are given the specific data of the liquid carbon black forming material (oil) used in Examples 1–4.

| Density 20° C. | g/l | 1.137 |
| --- | --- | --- |
| Distillation residue | g/100 ml | 3.4 |
| Residue according to Conradson | % | 1.6 |
| Asphaltines | % | 1.1 |
| Benzene insolubles | % | 0.02 |
| Boiling Properties | | |
| Beginning of boiling | °C. | 241 |
| Boiling curve | Vol. % | °C. |
| | 5 | 290 |
| | 10 | 306 |
| | 20 | 327 |
| | 30 | 335 |
| | 40 | 345 |
| | 50 | 352 |
| | 60 | 362 |
| | 70 | 375 |
| | 80 | 392 |

In the examples, there are given a series of lists according to DIN (German Industrial Standards) and ASTM standards. Not standardized, properly speaking, are the rubber mixtures in Examples 1 and 2. Therefore, there are given below the composition of the synthetic rubber test mixture (SBR) used and the oil extended synthetic rubber mixture (OE-SBR) used.

| Synthetic Rubber Mixture | |
| --- | --- |
| Buna-Huls 15 | 100 parts by weight |
| Carbon black | 50 parts by weight |
| Zinc oxide RS | 3 parts by weight |
| Stearic acid | 1 part by weight |
| Sulfur | 2 parts by weight |
| Accelerator, Vulcacit CZ (CBS) * | 1 part by weight |
| Vulcanization temperature | 145° C. |
| Oil Extended Synthetic Rubber Mixture | |
| Buna-Huls 1712 | 96.5 parts by weight |
| CB-10 (cis-polybutadiene) | 30.0 parts by weight |
| Carbon black | 75.0 parts by weight |
| Zinc oxide RS | 4.0 parts by weight |
| Stearic acid | 1.2 parts by weight |
| Naphtholen ZD (napthalene oil) | 12.0 parts by weight |
| PBN **** | 1.5 parts by weight |
| 4010 NA *** | 1.5 parts by weight |
| Santocure NS ** | 1.2 parts by weight |
| Sulfur | 1.6 parts by weight |
| Vulcanization temperature | 165° C. |

* N-cyclohexyl-benzothiazyl-2-sulfenamid
** Benzothiazyl-2-tert.butylsulfenamid
*** N-Isopropyl-N-phenyl-p-phenylendiamin
**** Phenyl-β-naphthylamin

EXAMPLE 1

In this Example, there is given a comparison of the previously customary procedure corresponding to Rothbühr German OS No. 2,410,565.5 (and related Rothbühr U.S. application Ser. No. 555,084, filed Mar. 4, 1975) with the process of the invention in the production of an ISAF quality.

| | Customary Process | Process of the Invention |
| --- | --- | --- |
| Cross-sectional area ratio Combustion Chamber inlet to Mixing Chamber inlet | 6.9 | 19.9 |
| Cross-sectional area ratio Reaction Chamber outlet to Mixing Chamber outlet | 3.3 | 7.1 |
| Ratio Combustion Chamber Length-Mixing Chamber Length | 1.8 | 2.6 |
| Annular Channel Length Based on Mixing Chamber Length (%) | — | 10 |
| Place of Carbon Black Forming Material Injector Outlet | In Combustion Chamber | In Mixing Chamber |

| | | Customary Process | Process of the Invention |
| --- | --- | --- | --- |
| Spraying Cone Angle-Carbon Black Forming Material Addition | | 20° | 90° |
| Inlet Velocity Annular Channel | | 340 m/sec. | 790 m/sec. |
| Amount of Combustion Air | Nm³/h | 2,900 | 2,900 |
| Amount of Atomizing Air | Nm³/h | 200 | — |
| Amount of Gas | Nm³/h | 240 | 240 |
| Amount of Carbon Black Forming Material | kg/h | 804 | 775 |
| Carbon Black Production | kg/h | 418 | 461 |
| Oil Yield | % | 52.0 | 59.5 |
| Analytical Carbon Black Properties | | Customary Process | Process of the Invention |
| Iodine Adsorbtion ASTM-D 1510 | mg/g | 125 | 124 |
| BET-Surface Area According to Haul | m²/g | 118 | 118 |
| DBP-number (Dibutyl phthalate) ASTM-D 2414 | ml/g | 1.19 | 1.21 |
| Color Strength According to DIN 53204 | | 88 | 96 |
| Properties of Industrial Rubber Carbon Black | | | |
| 300% Modulus SBR 50 minutes heating time | kp/cm² | 169 | 174 |
| Tensile strength SBR 50 minutes heating time | kg/cm² | 286 | 321 |
| Abrasion Resistance Compared to ISAF Standard Black | | 101 | 109 |
| Modulus 300% OE-SBR 20 minutes hot heating time | kp/cm² | 64 | 61 |
| Tensile Strength OE-SBR 20 minutes heating time | kp/cm² | 178 | 203 |

There can be derived from Example 1 a series of advantages for the process of the invention.

(1) At the same amount of air addition a higher hourly carbon black production is possible with clearly increased oil yields;

(2) At otherwise the same data for the specific carbon black area and the carbon black structure, the carbon black produced according to the invention has a considerably higher color strength;

(3) The tensile strength in the synthetic rubber and oil extended synthetic rubber are increased considerably;

(4) The abrasion resistance of the carbon black containing rubber increases.

EXAMPLE 2

Example 2 also relates to the production of a carbon black for the processing of rubber using the apparatus of FIG. 2. The type of carbon black is known under the designation N 375. Below are comparison tests according to the customary process of Rothbühr German OS No. 2,410,565.5 (and related Rothbühr U.S. application Ser. No. 555,084, filed Mar. 4, 1975) and the process of the invention.

| | | Customary Process | Process of the Invention |
|---|---|---|---|
| Cross-sectional area ratio Combustion Chamber inlet to Mixing Chamber inlet | | 6.9 | 19.9 |
| Cross-sectional area ratio Reaction Chamber outlet to Mixing Chamber outlet | | 3.3 | 7.1 |
| Ratio Combustion Chamber Length-Mixing Chamber Length | | 1.8 | 2.6 |
| Annular Channel Length Based on Mixing Chamber Length (%) | | — | 10 |
| Place of Carbon Black Forming Material Injector Outlet | | In Combustion Chamber | In Mixing Chamber |
| Spraying Angle-Carbon Black Forming Material Addition | | 15° | 78° |
| Inlet Velocity Annular Channel | | 300 m/sec. | 710 m/sec. |
| Combustion Air | Nm³/h | 2,600 | 2,600 |
| Atomizing Air | Nm³/h | 200 | — |
| Amount of Gas | Nm³/h | 205 | 215 |
| Amount of Carbon Black Forming Material | kg/h | 619 | 731 |
| Carbon Black Production | kg/h | 346 | 434 |
| Oil Yield | % | 55.9 | 59.4 |
| Analytical Carbon Black Properties: | | | |
| Iodine Adsorption ASTM D-1510 | mg/g | 93 | 93 |
| BET Surface Area According to Haul | m²/g | 102 | 100 |
| DBP-Number, ASTM D-2414 | ml/g | 1.14 | 1.15 |
| Color Strength According to DIN 53204 | | 86 | 95 |
| Properties of Industrial Rubber Carbon Black: | | | |
| 300% Modulus SBR 50 minutes heating time | kp/cm² | 178 | 179 |
| Tensile Strength SBR, 50 minutes heating time | kp/cm² | 241 | 271 |
| Abrasion Resistance Compared to HAF Standard | | 108 | 118 |
| 300% Modulus OE-SBR 20 minutes heating time | kp/cm² | 70 | 68 |
| Tensile Strength OE-SBR 20 minutes heating time | kp/cm² | 184 | 200 |

Also with this somewhat coarser scale type of carbon black than in Example 1, there can be seen the same advantages. Higher hourly carbon black capacity, higher oil yields in the production and at otherwise equal carbon black analytical data an increased color strength are produced. In the industrial rubber data there are established as an advantage higher tensile strength and better resistance to abrasion at constant 300% modulus.

EXAMPLE 3

This example also illustrates in comparison the new process. It is drawn to the production of a furnace type carbon black with higher surface area size with the apparatus of FIG. 2 as is used for the stabilization of polyethylene mixtures.

| | | Customary Process | Process of the Invention |
|---|---|---|---|
| Cross-sectional area ratio Combustion Chamber inlet to Mixing Chamber inlet | | 6.9 | 19.9 |
| Cross-sectional area ratio Reaction Chamber outlet to Mixing Chamber outlet | | 3.3 | 7.1 |
| Ratio Combustion Chamber Length-Mixing Chamber Length | | 1.8 | 2.6 |
| Annular Channel Length Based on Mixing Chamber Length (%) | | — | 10 |
| Place of Carbon Black Forming Material Injector Outlet | | In Combustion Chamber | In Mixing Chamber |
| Spraying Cone Angle-Carbon Black Forming Material Addition | | 20° | 120° |
| Inlet Velocity Annular Channel | | 330 m/sec. | 790 m/sec. |
| Conditions Employed: | | | |
| Amount of Combustion Air | Nm³/h | 2,800 | 2,900 |
| Amount of Atomizing Air | Nm³/h | 180 | — |
| Amount of Gas | Nm³/h | 230 | 230 |
| Amount of Carbon Black Forming Material | kg/h | 824 | 774 |
| Carbon Black Production | kg/h | 422 | 440 |
| Oil Yield | % | 52.2 | 56.8 |
| Analytical Carbon Black Properties: | | | |
| Iodine Adsorption ASTM D 1510 | mg/g | 140 | 139 |
| BET Surface Area | m²/g | 131 | 131 |
| DBP-Number | ml/g | 1.05 | 1.02 |
| Color Strength DIN 53204 | | 87 | 93 |
| Blackness Value in Linseed Oil | | 132 | 137 |

The blackness value is ascertained by making a paste of the carbon black in linseed oil and visually comparing with a standard paste. It represents a measure of the depth of color. High blackness value indicates high depth of color.

Here, also, there can be recognized clear advantages for the process of the invention. Besides a higher hourly carbon black production and higher oil yield, there are produced higher color strength and higher depth of color which are very advantageous for the uses mentioned.

EXAMPLE 4

In this Example, there is described the production of a carbon black in the apparatus of FIG. 2 which is intended for addition in high quality printing inks. For this use, carbon black qualities are needed which show a high color strength, a high depth of color and a favorable rheological behavior. A lower thickening of printing inks is, for example, then attained if carbon black with a lower structure is added. The DBP number can be important as a measure of the carbon black structure. The problem, therefore, is the inclusion of a carbon black with the lowest possible structure which is attained by addition of additives, e.g., potassium salts.

|  |  | Customary Process | Process of the Invention |
|---|---|---|---|
| Cross-sectional area ratio Combustion Chamber inlet to Mixing Chamber inlet |  | 6.9 | 19.9 |
| Cross-sectional area ratio Reaction Chamber outlet to Mixing Chamber outlet |  | 3.3 | 7.1 |
| Ratio Combustion Chamber Length-Mixing Chamber Length |  | 1.8 | 2.6 |
| Annular Channel Length Based on Mixing Chamber Length (%) |  | — | 10 |
| Place of Carbon Black Forming Material Injector Outlet |  | In Combustion Chamber | In Mixing Chamber |
| Spraying Angle- Carbon Black Forming Material Addition |  | 20° | 90° |
| Inlet Velocity Annular Channel |  | 260 m/sec. | 630 m/sec. |
| Reference Conditions: |  |  |  |
| Combustion Air | Nm³/h | 2,200 | 2,300 |
| Atomizing Air | Nm³/h | 250 | — |
| Amount of Gas | Nm³/h | 190 | 190 |
| Amount of Carbon Black Forming Material | kg/h | 700 | 757 |
| Additive (potassium chloride) | g/h | 1800 | 700 |
| Carbon Black Production | kg/h | 398 | 476 |
| Oil Yield | % | 56.9 | 62.8 |

| -continued |  |  |  |
|---|---|---|---|
| Analytical Carbon Black Properties: |  |  |  |
| Iodine Adsorption ASTM D-1510 | mg/g | 99 | 101 |
| BET Surface Area According to Haul | m²/g | 91 | 92 |
| DBP Number, ASTM D-2414 | ml/g | 0.51 | 0.49 |
| Color Strength According to DIN 53204 |  | 96 | 100 |
| Blackness Value in Linseed Oil |  | 142 | 148 |
| Ash Content | % | 0.45 | 0.24 |

From this example also there can be gathered clear advantages.

(1) In comparison to the conventional process, there are attained higher color strengths and blackness values;

(2) The carbon black production and oil yield are higher;

(3) In order to establish the desired extremely low DBP number (low structure) there were needed 2½ times less addition of additive. This is, therefore, significant because very high potassium contents accelerate the burning of hot carbon when it comes together with air for the first time after the production. Besides a higher alkali salt addition raises the ash content in undesired manner.

What is claimed is:

1. A process for the production of furnace black comprising thermally splitting a carbon black forming oil by introducing air tangentially into a combustion chamber oxidizing with this air a fuel gas in the combustion chamber and thereby producing a stream of hot combustion gases, introducing this stream stepwise into a mixing chamber constricted compared to the combustion chamber, spraying the carbon black forming material into the mixing chamber at a spraying angle between 45° and 180°, conveying the resultant mixture into a reaction chamber enlarged compared to the mixing chamber, quenching the carbon black containing reaction mixture formed and recovering the carbon black, the fuel gas being introduced radially from a point near the axis of the combustion chamber outwardly, said stream of hot combustion gases either (1) being introduced into the mixing chamber via a annular channel or (2) being introduced into an annular channel shaped mixing chamber, the axial velocity of the hot combustion gases at the entrance of the annular channel or mixing chamber being between 600 and 850 meters/sec., the carbon black forming material being sprayed into said mixing chamber or annular channel from a position within said mixing chamber or annular channel to a position outwardly from said within position.

* * * * *